United States Patent [19]

Krohn et al.

[11] 4,012,131

[45] Mar. 15, 1977

[54] HIGH STRENGTH OPHTHALMIC LENS

[75] Inventors: David A. Krohn, Southbridge, Mass.;
Emil W. Deeg, Woodstock, Conn.;
Robert E. Graf, Southeridge, Mass.

[73] Assignee: American Optical Corporation,
Southbridge, Mass.

[22] Filed: Aug. 20, 1975

[21] Appl. No.: 606,033

[52] U.S. Cl. .............................. 351/159; 351/166;
351/177; 65/30 E; 106/47 Q
[51] Int. Cl.² ........................................ G02C 7/02
[58] Field of Search ............... 351/159, 166, 177;
65/30 E; 106/47 Q, 52, 54

[56] References Cited

UNITED STATES PATENTS

| | | | |
|---|---|---|---|
| 3,287,200 | 11/1966 | Hess et al. | 351/166 X |
| 3,357,876 | 12/1967 | Rinehart | 351/166 X |
| 3,477,834 | 11/1969 | Morris | 351/166 X |
| 3,697,242 | 10/1972 | Shonebarger | 351/166 X |
| 3,741,739 | 6/1973 | Baker | 351/166 X |
| 3,743,491 | 7/1973 | Poole et al. | 351/166 X |
| 3,790,260 | 2/1974 | Boyd et al. | 351/159 |

*Primary Examiner*—David H. Rubin
*Attorney, Agent, or Firm*—William C. Nealon; H. R. Berkenstock, Jr.

[57] ABSTRACT

An ophthalmic glass lens can be prepared by exposing an alkali metal silicate glass to an ion exchange process in which the glass is chemically strengthened by an exchange of potassium ions for sodium ions in the surface layer of the lens at a temperature either above or below the strain point of the glass. The glasses prepared are essentially free of alumina, have adequate strength and substantially increased depth of pentration of the neutral zone even when up to about 6 percent lime is utilized in the preparation of the glass. The effect of lime as a diffusion-retarding agent during the ion exchange process can be overcome (1) by use of an appropriate amount of zinc or magnesium oxide or mixtures thereof so as to maintain an adequate rate of diffusion during ion exchange or (2) by preparation of the glass essentially free of alumina.

7 Claims, No Drawings

HIGH STRENGTH OPHTHALMIC LENS

BACKGROUND OF THE INVENTION

1. Field of the Invention:

This invention is in the field of chemical ion exchange treatment of a silicate glass to develop strength by compressively stressing a surface layer of the glass. Potassium ions are introduced into said surface layer in exchange for sodium ions.

2. Description of the Prior Art:

It is known to strengthen a glass article containing sodium ions by contact with a molten salt containing alkali metal ions having a diameter greater than that of the sodium ions in the glass. Where potassium ions are substituted for the sodium ions, a compressive stress is developed in the surface layer of the glass article as disclosed in the *Journal of the American Ceramic Society*, Vol. 45, No. 2 (February 1962) pages 59–68. In the process described in the above article, ion exchange was conducted at a temperature below the strain point of the glass so as to inhibit molecular rearrangement and viscous flow during ion exchange of the monovalent metal ions migrating into the glass surface. The larger ions from the molten salt in effect are squeezed into sites originally occupied by the smaller alkali metal ions. The compressive stress set up by this crowding effect substantially increases the impact strength of the glass.

In an article entitled "Strengthening by Ion Exchange" in the *Journal of the American Ceramic Society*, May 1964, pages 215–219, glasses are described which contain substantial amounts of aluminum oxide or zirconium oxide. These glasses are said to be uniquely capable of having strength imparted thereto by an ion exchange process conducted below the strain point of the glass. Such glasses also maintain high strength subsequent to being abraded to simulate ordinary usage.

Ion exchange treatment of alkali metal silicate glasses has been conducted at temperatures above the strain point of the glass as well as below the strain point of the glass. In this process, the smaller lithium ion replaces the larger sodium and/or potassium ions in contrast to the process described above where a larger ion (potassium) replaces a smaller ion (sodium) below the strain point of the glass. In one method of chemical strengthening described in U.S. Pat. No. 2,779,136, a silicate glass containing exchangeable potassium or sodium ions is treated at a temperature above its strain point with a source of lithium ions, for example, a molten lithium salt. The lithium ions migrate into the glass in exchange for potassium or sodium ions which migrate out into the lithium salt. During the exchange process, molecular re-arrangement occurs in the glass since exchange takes place at a temperature above the strain point of the glass. The smaller lithium ions form a new surface layer on the glass having a lower coefficient of expansion than the original glass. As the article cools, compressive stresses are set up by differential thermal expansion.

In copending application Ser. No. 390,742 filed Aug. 23, 1973, now abandoned and assigned to the Assignee of the instant invention, a process is disclosed for treating an alkali metal silicate ophthalmic glass by an ion exchange process utilizing a molten bath of potassium nitrate at a temperature ranging from 760° F to 960° F. This latter temperature is above the strain point of this ophthalmic glass but is well below the softening point of the glass. The process has the advantage that a shorter exchange period is thereby made feasible.

Comparison results obtained in high temperature and low temperature ion exchange processes indicate that the low temperature ion exchange process, that is, one conducted at a temperature below the strain point of the glass results in a glass having a stressed surface layer which is normally relatively shallow and that in order to obtain deeper penetration longer treatment times are required. In the high temperature ion exchange process, that is, one using temperatures above the strain point of the glass, a stressed layer is obtained which is normally relatively deep in comparison to stressed layers obtained by the low temperature ion exchange process. Presumably because molecular rearrangement can take place, lower compressive stresses are obtained in the stressed layer of the glass treated using this process.

Because a strengthened ophthalmic lens to be capable of providing satisfactory service must not only resist breakage by impact when the lens is newly produced, but also, as a practical matter, must provide resistance to impact even after the lens surfaces have been abraded as will occur from handling and cleaning both in production and by the user, it has been found that the depth of penetration is of at least equal importance in comparison to the desired improvement in compressive stress.

In U.S. Pat. No. 3,790,260, there is provided recognition of the importance of depth of penetration of the compressively stressed surface layer (neutral zone depth) as a means of insuring a satisfactory ophthalmic lens which will resist lens breakage even after abrasion as a result of normal use. The high strength ophthalmic lens disclosed in U.S. Pat. No. 3,790,260 is obtained by limiting the lime content of the ion-exchange glass composition since it has been found that calcium oxide in the glass has a deleterious effect upon the strength after abrading as well as results in a reduction in the depth of the compressively stressed surface layer and therefore, the patent teaches inclusion of only very minor amounts of lime up to about 3 percent can be tolerated without destroying the desired strength of the lens.

Typically, the ophthalmic glass industry has employed soda-lime-silica base glasses for the production of ophthalmic lenses in which 8–15 percent lime (calcium oxide) is included. The lime-type glass has usually been preferred because of its good chemical durability, the ready availability of high purity raw materials a relatively low cost and because calcium oxide is needed to maintain good melting, forming and processing properties in the glass.

SUMMARY OF THE INVENTION

This invention relates to a composition of soda-silica glass or soda-lime-silica glass which is particularly suitable for the production of strengthened ophthalmic glass lenses by a chemical ion exchange treatment utilizing, for instance, a bath of potassium nitrate at temperature either above or below the glass strain point. The composition is substantially similar to traditional ophthalmic glass compositions of the glass industry which have employed soda-lime-silica base glass for the production of ophthalmic lens blanks except that the composition is rendered particularly susceptible to chemical ion exchange strengthening by (1) t inclusion of an appropriate amount of magnesium or zinc oxide or mixtures thereof to replace a portion of the usual amount of calcium oxide sufficient to balance the rate-retarding effect of calcium oxide in the ion exchange process or by (2) preparation of the glass essentially free of alumina. By the essential exclusion of alumina or by inclusion of adequate magnesium or zinc oxide or mixtures thereof in the glass, diffusion of the potassium ion into the surface of the glass is increased without adversely affecting the desired properties. This compensates for the undesirable rate retardation effect observed where calcium oxide is present in the composition in a substantial amount. In addition, the composition also includes a substantial proportion of potassium oxide to enhance the thickness of the compressive layer.

DESCRIPTION OF THE PREFERRED EMBODIMENTS

A strengthened ophthalmic lens capable of providing satisfactory service must not only resist breakage by impact as newly produced but also, as a practical matter, must resist breakage after the lens surfaces have been abraded as will occur from handling and cleaning by the user. Development of a suitable chemically-strenthened ophthalmic lens has received emphasis from recent federal enactments requiring that such ophthalmic lenses pass a minimum impact strength test. Specifically, the lens is required to withstand the impact provided by dropping a ⅝ inch steel ball from a distance of 50 inches onto the convex surface of the glass lens.

It has now been found that a suitably-strengthened ophthalmic glass lens which will reproducibly pass the above tests is characterized as having a compressively-stressed surface layer that is at least about 60 microns in depth and in which the surface layer is compressively stressed sufficient to provide a modulus of rupture of at least 15,000 pounds per square inch. The corresponding counter tensile stress which is necessarily generated in the central zone of the lens within the compressively-stressed surface layers should be maintained below 3 kilograms per square millimeter.

The glass composition which has been found to be particularly suitable for obtaining such characteristics by a chemical ion exchange process either above or below the strain point of the glass is a silicate glass composition comprising silica and the following ingredients by weight: about 3 to about 11 percent sodium oxide, about 7 to about 15 percent potassium oxide, about 3 to about 6 percent calcium oxide, about 3 to about 11 percent zinc oxide or magnesium oxide or mixtures thereof and about 0.2–0.5 of aluminum oxide or zirconium oxide. Optional ingredients include up to 5 percent titanium oxide, up to 2 percent boron oxide and up to 5 percent of other alkali metal oxides. In the production of the glass, up to 2 percent of fining agents are conventionally used consisting of antimony oxide, cerium oxide and arsenic oxide.

It has been found that the various compositional limits above must be carefully observed to provide a glass that is capable of having imparted to it the various stress characteristics set forth above as well as the conventional optical characteristics of an ophthalmic lens. For instance, it has been found that such ophthalmic glasses must contain at least 7 percent potassium oxide in order to provide sufficient depth of the compressive layer so that the lens will retain its strength characteristics subsequent to the abrasive injury of the glass surface under ordinary conditions of use.

Calcium oxide provides good melting, forming and processing properties, but tends to retard the diffusion rate during the ion exchange process in which potassium ions are exchanged for sodium ions and, therefore, the amount of about 3 to about 6 percent calcium oxide used is required to be balanced by an amount of about 3 to about 11 percent zinc or magnesium oxides or mixtures thereof in order that the rate of diffusion and depth of penetration obtained during the ion exchange process can be maintained at a suitable value. The present glasses are based upon the discovery that zinc oxide and/or magnesium oxide or mixtures thereof can be used for the purpose of balancing the detrimental effect of calcium on rate of diffusion and depth of penetration during ion exchange of the glass. Calcium oxide, zinc oxide and magnesium oxide are also conventionally used in the improvement of chemical stability of ophthalmic glass.

While it is known in the prior art that the resistance to weathering and acid attack of a glass can be considerably enhanced by including in the glass composition a substantial amount of alumina and that the use of 5 to 25 percent alumina enhances ion exchange strengthening, it has been found that suitably-strengthened ophthalmic lenses can be prepared utilizing as little as 0.2 percent alumina. Generally, about 0.2 to about 0.5 of alumina or zirconia in the compositions of the invention provide glass compositions showing improved depth of penetration of the ion-exchanged layer.

In another embodiment of the invention, conventional amounts of about 1 to about 5 percent aluminum or zirconium oxides can be present in the ophthalmic glass compositions of the invention. Such glass compositions show a reduced rate of diffusion during the ion exchange process and, accordingly, substantially less penetration of the ion-exchanged surface layer. Nevertheless, suitable ophthalmic glass compositions can be prepared which contain by weight up to 6 percent, preferably about 3 to about 6 percent calcium oxide. Suitable strengthened ophthalmic glass lenses can be prepared by carefully controlling the alkali metal oxide content, particularly the ratio of sodium to potassium oxides. It has been found that for optimum strength and depth of the ion-exchanged compressive layer that (1) the proportion of potassium oxide should predominate over the proportion of sodium oxide and (2) the proportion of zinc or magnesium or mixtures thereof should be increased proportionally to the proportion of calcium oxide present in order to compensate for the rate-retarding and depth-decreasing tendency of calcium oxide.

While it is known in the prior art to produce a strengthened ophthalmic glass by maintaining calcium oxide content at a minimum of up to 3 percent, it is desirable to include amounts of about 3 percent to about 6 percent calcium oxide in the glass to obtain the well-known advantages of good melting, forming and processing.

It is known that an insufficient content of silicon dioxide will cause easy devitrification and make the forming of the ophthalmic glass lens difficult. On the other hand, if the silicon dioxide content is too high, the glass becomes hard and melting and forming of the glass is difficult. Therefore, the silicon dioxide content should be as high as possible, desirably between about 60 to about 70 percent.

It is desirable to have at least 7 percent potassium oxide in the ophthalmic glass compositions of the invention but an excess of potassium oxide is undesirable since this will increase the viscosity of the glass and, therefore, no more than about 15 percent of potassium oxide should be used in the compositions of the invention.

The sodium oxide present in the glass compositions of the invention is the source of sodium ions for ion exchange with potassium ions in the ion exchange reaction. Where the sodium oxide content of the glass of the invention exceeds about 11 percent by weight the viscosity of the glass will be reduced and the strain point will be lowered. With less than about 3 percent sodium oxide content, the ophthalmic glass compositions of the invention suffer impaired melting and forming properties as the result of an increase in the viscosity of the glass. In addition, the lens shows a tendency to become devitrified.

The use of substantial proportions of divalent metal oxides such as calcium oxide, zinc oxide and magnesium oxide improve the melting properties of the glass as indicated by a reduced viscosity curve. The glass is thereby made more suitable for forming ophthalmic lenses. Calcium oxide content should be as high as possible to reduce cost without sacrifice of quality. By the teaching of this invention, maximum amounts of calcium oxide can be present in the glass. The use of boric oxide which is commonly used to reduce the melting range of an ophthalmic glass lens composition, therefore, need not be utilized for this effect. The known deleterious effect of boric oxide contained in the glass composition which is to be subsequently strengthened by chemical ion exchange is, therefore, avoided.

In carrying out the ion exchange treatment, the lenses after formation are suitably ground, polished and edged and then treated by immersing the lens in a molten salt bath containing potassium ions which consists substantially of potassium nitrate, potassium sulfate or a mixture thereof, said salt bath being maintained at an elevated temperature either above or below the glass strain point. Where the ion exchange treatment is conducted at a temperature below the glass strain point in order to avoid release of the compressive stresses generated, the ion exchange treatment is generally conducted at temperatues of from about 20° C to about 120° C below the strain point of the glass. However, the temperature at which the exchange is conducted preferably is at least about 350° C. It has been noted that the thickness of the ion exchange layer increases approximately in proportion to the square root of the treating time. By conducting the ion exchange treatment at a temperature below the strain point of the glass, the stressed surface layer is obtained in a thickness of about 60 to about 140 microns and the compressive stress obtained is about 20,000 to about 50,000 pounds per square inch. Ion exchange treatment conducted at a temperature above the strain point of the glass provides increased depth of penetration and a correspondingly reduced compressive stress. Corresponding values are a thickness of the compressed surface layer of about 70 to about 170 microns and compressive stress of about 14,000 to about 45,000 pounds per square inch. The strengthening is directly proportional to the compressive stress value at the depth of the flaws in the glass. The thickness of the compressive stress layer must, therefore, be deeper than the flaws in the glass to provide a strengthened glass.

The ion exchange treatment of the glass of the instant invention can take place at a temperature either above or below the strain point of the glass. At treatment temperatures ranging from about 454° C to about 510° C which temperatures are well below the softening point for the glass compositions of the invention, suitable strengthening is obtained.

The terminology "alkali metal silicate" is used in this specification in its conventional sense to indicate a glass composition in which the silicon dioxide is the sole or primary glass-forming oxide, one or more alkali metal oxides constituting the principal glass modifier and there is normally at least one additional divalent metal glass modifying oxide.

The following examples illustrate the various aspects of the invention but are not intended to limit it. Where not otherwise specified throughout this specification and claims, temperatures are given in degrees centigrade and parts are by weight. The glasses disclosed in this invention were made in platinum crucibles using standard glass making techniques. The raw materials consisted of high purity silica, aluminum hydroxide magnesium oxide, nitrates and carbonates of sodium and potassium, zinc oxide, etc. which were thoroughly mixed prior to melting. A platinum crucible was used having a 2.5 liter capacity. This was preheated at 1425 in an electric furnace. The batch was transferred to the crucible in 400 to 500 gram portions. After the crucible was sufficiently full, the temperature was raised to 1480° C for 3 hours. The melt was held at 1370° C for 16 hours and then stirred for 6 hours at 1340° C and cast into a sheet at that temperature. The glass was then transferred to an annealing furnace and annealed by holding the glass in the annealing range of about 565 for about 1 hour and then cooling the glass at a rate of about 50° C per hour until the glass reaches room temperature.

Photoelastic analysis of the sample specimens was performed using a polarizing microscope with a quartz wedge compensator for stress measurements. The depth of the compressive layer was measured with polarizing microscope using the Freidel technique with a filar eyepiece. In the following examples, the strength of the glass compositions of the invention is compared with the strength properties of a conventional ophthalmic crown glass composition similarly ion exchange The examples clearly show that the compositions of the invention provide glass compositions having either increased compression strength or depth of compressively-stressed layer (neutral zone).

EXAMPLES 1–11

Samples of glasses shown in Table I below were prepared by the above procedure and thereafter bars from the glass sheet obtained as detailed above were ion exchanged at temperatures of either 510° C or 45 C which are respectively above and below the strain point of conventional ophthalmic glass as exemplified by Example 11 (control). Results are shown in Table II and III.

TABLE I

GLASS COMPOSITIONS FOR ION EXCHANGE

| | Ex. 1 | Ex. 2 | Ex. 3 | Ex. 4 | Ex. 5 | Ex. 6 | Ex. 7 | Ex. 8 | Ex. 9 | Ex. 10 | (control) Ex. 11 |
|---|---|---|---|---|---|---|---|---|---|---|---|
| $SiO_2$ | 65.00 | 65.00 | 65.00 | 63.35 | 62.70 | 69.80 | 69.80 | 69.50 | 69.50 | 69.50 | 68.00 |
| $Al_2O_3$ | 2.50 | 2.50 | 2.50 | 2.50 | 2.50 | 0.20 | 0.20 | 0.50 | 0.50 | 0.50 | 1.90 |
| CaO | 3.00 | 4.00 | 5.00 | 3.10 | 3.30 | 3.50 | 4.50 | 3.50 | 4.50 | — | 8.50 |
| MgO | 2.00 | 2.00 | 2.00 | 3.25 | 3.25 | — | — | — | — | — | — |
| ZnO | 8.00 | 7.00 | 6.00 | 7.65 | 7.60 | 8.00 | 7.00 | 8.00 | 7.00 | 11.50 | 3.00 |
| $Na_2O$ | 8.50 | 8.50 | 8.50 | 7.00 | 8.45 | 7.00 | 7.00 | 7.00 | 7.00 | 7.00 | 8.20 |
| $K_2O$ | 8.50 | 8.50 | 8.50 | 10.80 | 9.50 | 11.00 | 11.00 | 11.00 | 11.00 | 11.00 | 8.90 |
| $B_2O_3$ | 1.00 | 1.00 | 1.00 | 1.10 | 1.10 | — | — | — | — | — | — |
| $TiO_2$ | 0.70 | 0.70 | 0.70 | 0.75 | 1.10 | — | — | — | — | — | 0.50 |
| $As_2O_3$ | 0.40 | 0.40 | 0.40 | 0.25 | 0.25 | 0.25 | 0.25 | 0.25 | 0.25 | 0.25 | 0.50 |
| $Sb_2O_3$ | 0.40 | 0.40 | 0.40 | 0.25 | 0.25 | 0.25 | 0.25 | 0.25 | 0.25 | 0.25 | 0.50 |

TABLE II

PHYSICAL PROPERTIES OF GLASSES FOR ION EXCHANGE

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Refractive Index | 1.522 | 1.523 | 1.524 | 1.523 | 1.524 | 1.512 | 1.515 | 1.512 | 1.514 | 1.508 | 1.523 |
| Strain Point (°C) | 504 | 502 | 503 | 517 | 511 | 484 | 488 | 488 | 487 | 476 | 500 |
| Softening Point (°C) | 737 | 736 | 729 | 750 | 726 | 731 | 729 | 732 | 733 | 744 | 731 |
| Coefficient of Expansion (°C × $10^6$) | 9.4 | 9.4 | 9.9 | 9.4 | 9.9 | 9.3 | 9.8 | 9.3 | 9.0 | 8.8 | 10.3 |

TABLE III

STRENGTH OF GLASS COMPOSITIONS AFTER ION EXCHANGE

| Ion Exchange Surface Compression (psi.) | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| 454° C–16 hrs. | 46,200 | 45,600 | 49,000 | 42,500 | 48,700 | 29,200 | 26,700 | 29,000 | 29,600 | 23,900 | 30,000 |
| 510° C–6 hrs. | 44,200 | 39,700 | 45,200 | 44,000 | 34,200 | 19,400 | 18,400 | 18,200 | 17,300 | 14,000 | 28,000 |
| Depth of Compression ($\mu m$) | | | | | | | | | | | |
| 454° C–16 hrs. | 63 | 61 | 57 | 84 | 67 | 96 | 87 | 114 | 84 | 134 | 50 |
| 510° C–6 hrs. | 71 | 69 | 63 | 72 | 71 | 94 | 99 | 117 | 90 | 160 | 53 |

While this invention has been described with reference to certain specific embodiments, it will be recognized by those skilled in the art that many variations are possible without departing from the scope and spirit of the invention.

We claim:

1. A chemically-strengthened ophthalmic glass lens having a compressively-stressed ion-exchanged surface zone that is at least 60 microns in depth, said lens being formed from a silicate glass comprising by weight about 3 to about 11 percent sodium oxide, about 7 to about 15 percent potassium oxide, up to about 5 percent of other alkali metal oxides, about 12 to about 20 percent of a total of sodium and potassium oxides and other alkali metal oxides, a minimum of 3 to about 6 percent of calcium oxide, the calcium oxide being balanced by an amount of about 3 to about 11 percent of a metal oxide selected from the group consisting of zinc oxide, magnesium oxide, and mixtures thereof, the oxides selected from said group being present in an amount sufficient to assure that the rate of diffusion and depth of penetration obtained during ion exchange of said lens is not detrimentally affected by the presence of the calcium oxide during ion exchange, and the balance of lens being silica.

2. A chemically strengthened ophthalmic glass lens according to claim 1 further including about 0.2 to about 0.5 percent of aluminum or zirconium oxide.

3. A chemically-strengthened ophthalmic glass lens according to claim 2 wherein said glass consists by weight of 11 percent potassium oxide, 8 percent zinc oxide, 7 percent sodium oxide, 3.5 percent calcium oxide, 0.2 percent aluminum oxide, 0.25 percent arsenic oxide, 0.25 percent antimony oxide and the balance silica.

4. A chemically-strengthened ophthalmic glass lens according to claim 2 consisting by weight of 11 percent potassium oxide, 7 percent sodium oxide, 7 percent zinc oxide, 4.5 percent calcium oxide, 0.2 percent aluminum oxide, 0.25 percent arsenic oxide, 0.25 percent antimony oxide and the balance silica.

5. A chemically-strengthened ophthalmic glass lens according to claim 2 consisting by weight of 11 percent potassium oxide, 7 percent sodium oxide, 8 percent zinc oxide, 3.5 percent calcium oxide, 0.5 percent aluminum oxide, 0.25 percent arsenic oxide, 0.25 percent antimony oxide and the balance silica.

6. A chemically strengthened ophthalmic glass lens according to claim 1 further comprising about 1 to about 5 percent of aluminum or zirconium oxide.

7. A chemically strengthened ophthalmic glass lens according to claim 1 consisting by weight of 10.8 percent potassium oxide, 7 percent sodium oxide, 7.7 percent zinc oxide, 3.3 percent magnesium oxide, 3.1 percent calcium oxide, 2.5 percent aluminum oxide, 1.1 percent boron oxide, 0.8 percent titanium oxide, 0.25 percent arsenic oxide, 0.25 percent antimony oxide and the balance silica.

* * * * *

UNITED STATES PATENT OFFICE
CERTIFICATE OF CORRECTION

Patent No. 4,012,131            Dated March 15, 1977

Inventor(s) David A. Krohn et al

It is certified that error appears in the above-identified patent and that said Letters Patent are hereby corrected as shown below:

The sheet containing drawings should be deleted.

Signed and Sealed this

Tenth Day of January 1978

[SEAL]

*Attest:*

RUTH C. MASON
*Attesting Officer*

LUTRELLE F. PARKER
*Acting Commissioner of Patents and Trademarks*